United States Patent
Finck

(10) Patent No.: US 12,456,067 B2
(45) Date of Patent: Oct. 28, 2025

(54) SUPPRESSING SUPERCONDUCTING QUBIT MEASUREMENT-INDUCED STATE TRANSITIONS

(71) Applicant: International Business Machines Corporation, Armonk, NY (US)

(72) Inventor: Aaron Finck, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 360 days.

(21) Appl. No.: 18/161,365

(22) Filed: Jan. 30, 2023

(65) Prior Publication Data

US 2024/0403681 A1    Dec. 5, 2024

(51) Int. Cl.
 G06N 10/40  (2022.01)
 H03K 17/92  (2006.01)

(52) U.S. Cl.
 CPC ............ *G06N 10/40* (2022.01); *H03K 17/92* (2013.01)

(58) Field of Classification Search
 CPC .............................. H03K 17/92; G06N 10/40
 See application file for complete search history.

(56) References Cited

U.S. PATENT DOCUMENTS

| | | | |
|---|---|---|---|
| 10,013,657 B2 | 7/2018 | Bourassa et al. | |
| 10,467,544 B2 | 11/2019 | Filipp et al. | |
| 2019/0007051 A1* | 1/2019 | Sete | H03K 19/195 |
| 2021/0384404 A1 | 12/2021 | Finck et al. | |
| 2021/0406746 A1 | 12/2021 | Stehlik et al. | |
| 2021/0408112 A1 | 12/2021 | Finck et al. | |
| 2021/0408113 A1* | 12/2021 | Finck | H01P 3/003 |
| 2022/0058508 A1 | 2/2022 | Srinivasan et al. | |
| 2022/0374755 A1* | 11/2022 | Didier | G06N 10/40 |
| 2023/0180631 A1* | 6/2023 | Finck | G06N 10/20 327/366 |

(Continued)

FOREIGN PATENT DOCUMENTS

WO    WO-2019117949 A1 *    6/2019    ............ G06N 10/00

OTHER PUBLICATIONS

Anonymous, "Miniaturized Transmon Qubit for Large Scale Integration," IP.com Electronic Publication Date: Oct. 13, 2020, IP.com No. IPCOM000263866D.

(Continued)

*Primary Examiner* — Patrick O Neill
(74) *Attorney, Agent, or Firm* — Amin, Turocy & Watson, LLP

(57) ABSTRACT

One or more electronic systems, electronic structures and/or methods provided herein relate to quantum state measurement while suppressing measurement-induced state transition in a superconducting qubit. An electronic system can comprise a superconducting qubit coupled to a tunable coupler qubit (TCQ), and a microwave drive port coupled to the TCQ. A resonator can be coupled between the TCQ and the microwave drive port. The resonator can be coupled to the microwave drive port by direct capacitive coupling or inductive coupling. The superconducting qubit can be coupled to the TCQ by a pair of parallelly-arranged coupling capacitors having equal capacitance to one another, or the resonator can be coupled to the TCQ by a pair of parallelly-arranged coupling capacitors having equal capacitance to one another.

25 Claims, 10 Drawing Sheets

(56) References Cited

U.S. PATENT DOCUMENTS

2023/0401475 A1* 12/2023 Finck .................. H10N 60/128
2023/0409942 A1* 12/2023 Sete ...................... G06N 10/20
2024/0078460 A1*  3/2024 Finck .................... G06N 10/40

OTHER PUBLICATIONS

Sank, et al., "Measurement-Induced State Transitions in a Superconducting Qubit: Beyond the Rotating Wave Approximation," Phys. Rev. Lett. 117, 190503 (Nov. 15, 2016), https://arxiv.org/abs/1606.05721.

Gambetta, et al., "A superconducting qubit with Purcell protection and tunable coupling," Phys. Rev. Lett. 106, 030502 (Sep. 22, 2010), https://arxiv.org/abs/1009.4470.

Srinivasan, et al., "Tunable coupling in circuit quantum electrodynamics with a superconducting V-system," Phys. Rev. Lett. 106, 083601 (Nov. 18, 2010), https://arxiv.org/abs/1011.4317.

Hoffman, et al., "Coherent Control of a Superconducting Qubit with Dynamically Tunable Qubit-cavity Coupling," Phys. Rev. B 84, 184515 (Aug. 12, 2011), https://arxiv.org/abs/1108.2705.

Zhang, et al., "Suppression of photon shot noise dephasing in a tunable coupling superconducting qubit," npj Quantum Information, vol. 3, No. 1, (Jan. 20, 2017), https://arxiv.org/abs/1603.01224.

* cited by examiner

SUPPRESSING SUPERCONDUCTING QUBIT MEASUREMENT-INDUCED STATE TRANSITIONS

FIELD OF THE INVENTION

The present disclosure relates generally to measuring quantum states of superconducting qubits, and more specifically to measuring such quantum states while also suppressing measurement-induced quantum state transitions of the superconducting qubits for which quantum state measurement is being executed.

BACKGROUND

In quantum computing systems, qubits, such as superconducting qubits are acted upon by a pulse, signal and/or tone to cause an effect, such as a change in quantum state of the qubit. A pulse, signal and/or tone also can be applied to a quantum system tor purposes of measurement readout, to measure a property of a qubit, such as to measure a quantum state. In the case of measurement readout, a change in quantum state caused by the measurement pulse can be undesired and can cause measurement error during the measurement readout. This measurement error can be detrimental to quantum computation and/or quantum error correction.

SUMMARY

The following presents a summary to provide a basic understanding of one or more embodiments described herein. This summary is not intended to identify key or critical elements, and/or to delineate scope of embodiments or scope of claims. Its sole purpose is to present concepts in a simplified form as a prelude to the more detailed description that is presented later. In one or more embodiments described herein, systems, methods and/or apparatuses can facilitate a process to employ an electronic chip at a substrate, such as a silicon chip at a printed circuit board (PCB), with reduction of, and/or fully absent of, a measurement-induced state transitions that can occur during operation of measurement pulses for measurement readout at a quantum system comprising the electronic chip.

In accordance with one or more embodiments, an electronic system can comprise a superconducting qubit coupled to a tunable coupler qubit (TCQ), and a microwave drive port coupled to the TCQ.

In accordance with one or more embodiments, an electronic structure can comprise a superconducting qubit coupled to a tunable coupler qubit (TCQ), and a resonator coupled to the TCQ and configured to be coupled to a microwave drive port.

In accordance with one or more embodiments, an electronic system can comprise a superconducting qubit coupled to a resonator that is in turn coupled to a microwave drive port of readout electronics of a qubit state readout subsystem, wherein exchange coupling is absent between the superconducting qubit and the resonator.

In accordance with one or more embodiments, a method of using a quantum system can comprise sending, by a system operatively coupled to a processor, a readout signal to a resonator through a microwave drive port coupled to a tunable coupler qubit (TCQ) that is in turn coupled to a superconducting qubit, and receiving, by the system, a return readout signal at readout electronics coupled to the microwave drive port.

In accordance with one or more embodiments, a method of using a quantum system can comprise conducting, by a system operatively coupled to a processor, a dispersive readout of a state of a superconducting qubit, using readout electronics coupled to the superconducting qubit by a resonator, wherein exchange coupling is absent between the superconducting qubit and the resonator.

An advantage of the aforementioned electronic structures, electronic systems and/or methods can be an ability to read a quantum state of a superconducting qubit with minimal and/or omitted unintentional driving of the transmon of the superconducting qubit. In connection therewith, the advantage further can be provided by reduction in leakage errors for measurement of the superconducting qubit.

Another advantage of the aforementioned electronic structures, electronic systems and/or methods can be reduction in overall, and indeed compound, quantum error correction in a configuration of a scalable quantum computer employing a plurality of superconducting qubits. That is, the aforementioned electronic structure, electronic system and/or method can perform dispersive readout for a plurality of superconducting qubits, where each dispersive readout can provide less or no unintended driving of neighboring superconducting qubits.

In one or more of the aforementioned electronic structures, electronic systems and/or methods, a resonator is coupled between the TCQ and the microwave drive port by direct capacitive coupling or inductive capacitive coupling. Further, a second drive port is separately directly coupled to the superconducting qubit, allowing for the superconducting qubit to be driven separately.

In one or more of the aforementioned electronic structures, electronic systems and/or methods, the superconducting qubit is coupled to the TCQ by a pair of parallelly-arranged coupling capacitors having equal capacitance to one another, or the resonator is coupled to the TCQ by a pair of parallelly-arranged coupling capacitors having equal capacitance to one another.

Relative to any of the one or more additional features, an advantage can be allowing for the superconducting qubit to be coupled relative to the resonator without exchange coupling between the superconducting qubit and the resonator. In this way, pulses employed to read a state of the resonator are restricted and/or altogether prevented from unintentionally driving the superconducting qubit. Indeed, such unintentional driving could cause the qubit to be outside of its computational basis, existing in a second or higher excited state. This unintended consequence that is restricted and/or prevented by one or more embodiments described herein can be referred to as qubit leakage.

DETAILED DESCRIPTION

Figure 1:
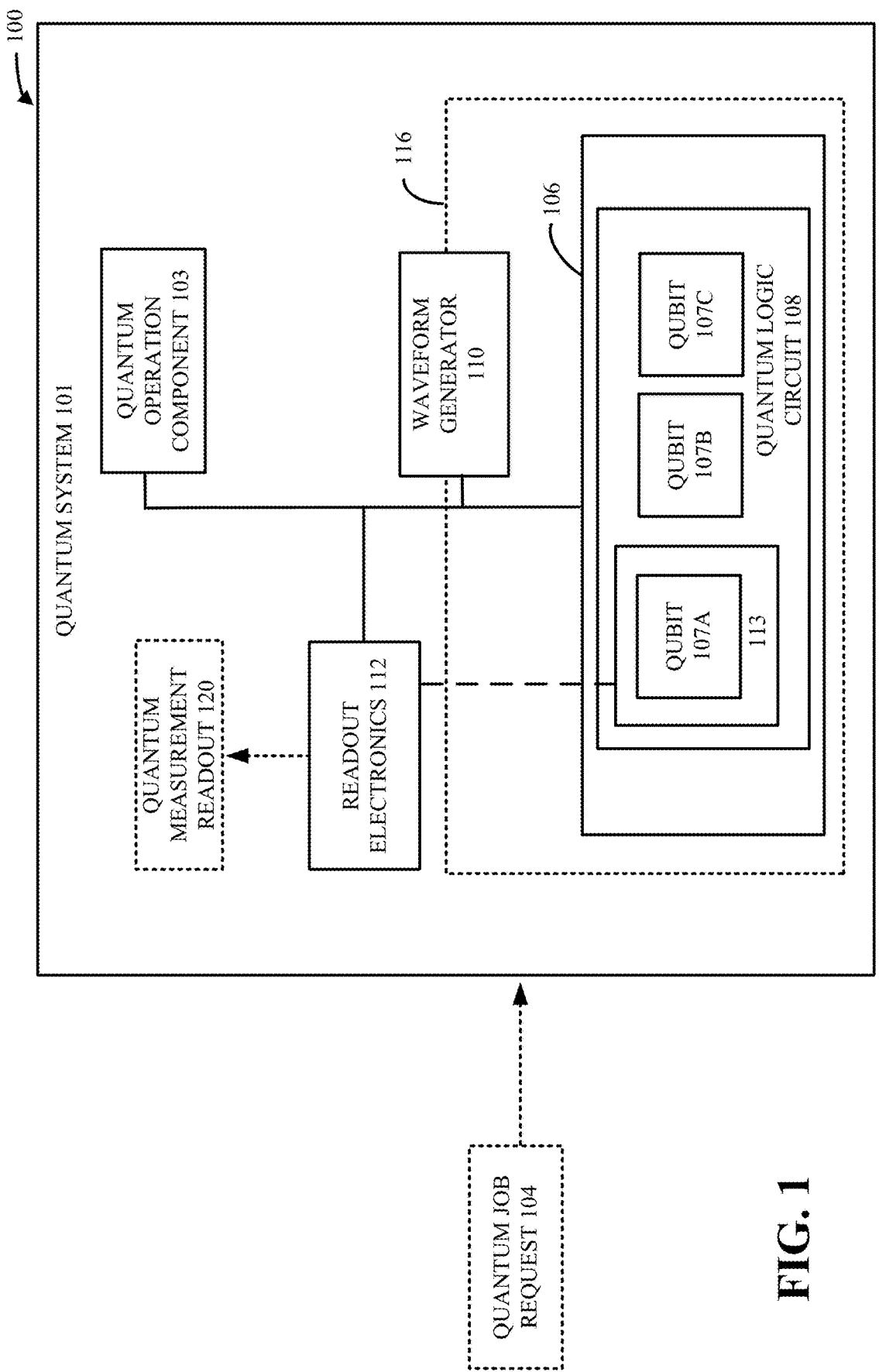
FIG. 1 illustrates a block diagram of an example, non-limiting system that can facilitate measurement readout from one or more qubits, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section or in the Detailed Description section. One or more embodiments are now described with reference to the drawings, wherein like reference numerals are utilized to refer to like elements throughout. In the following description, for purposes of explanation, numerous details are set forth in order to provide a more thorough understanding of the one or more embodiments. However, in various cases, one or more embodiments can be practiced without these details.

Discussion is provided herein relative to configuration, including fabrication, of an electronic structure that can comprise and/or be comprised by a controller, payload and/or other chip-based structure. In one or more embodiments, the electronic structure can be configured for use in a quantum system, such as for use within a cryogenic unit. However, as there are many uses for devices comprising silicon chips, the discussion herein need not apply solely to quantum computer electronics, but can also apply to many other control, radio, radar, cryogenic and/or signal-based applications, among others. Description and discussion herein is therefore not limited to use in a quantum computing system.

Turning first to existing frameworks for payload and measurement readout construction, such as relative to superconducting electronic circuits, a waveguide resonator, such as a coplanar waveguide resonator, can be directly coupled to a superconducting element for readout of properties of the superconducting element. For example, in quantum computing applications, a waveguide resonator can be directly coupled to a superconducting qubit, such as a transmon data qubit or TCQ interconnect with the waveguide resonator coupled to a microwave drive port. A microwave pulse can be generated and input at the microwave drive port. The microwave drive port and the waveguide resonator can be coupled inductively or capacitively.

However, relative to superconducting qubits, the property being measured, such as a quantum state of the qubit, can be affected by existing measurement techniques. That is, as mentioned, quantum states can be measured by applying microwave tones to resonators that are directly coupled to the superconducting qubits. However, the measurement pulses (e.g., the microwave tones) can inadvertently cause the qubit to exhibit leakage. This leaking can be described as the qubit leaking out of the computational basis (e.g., transitioning to a higher excited state). This leakage can be detrimental to quantum computation in general and to quantum error correction in particular. Ultimately, the unintended leakage is caused by direct exchange coupling between the superconducting qubit and the microwave readout resonator. This problem is further exacerbated when scaling a quantum computer to comprise a plurality of superconducting qubits that are each being measured by existing techniques.

To account for one or more of these deficiencies of existing frameworks for readout measurement of superconducting elements, such as superconducting qubits, one or more embodiments described herein can provide a configuration, and method of configuration, for coupling of a superconducting element (e.g., superconducting qubit) to a microwave drive port that can receive a microwave tone/measurement pulse as an input. Moving forward, this description will refer to a superconducting qubit, but can be applicable otherwise.

Generally, the one or more embodiments herein can provide for measurement readout, such as dispersive readout (e.g., comprising a dispersive interaction between the superconducting qubit and the associated readout resonator) without direct exchange coupling between the superconducting qubit (e.g., data qubit) and the readout resonator.

The one or more embodiments described herein can be configured for use with and/or to comprise a multi-mode qubit. This qubit can be one that comprises strongly interacting, anharmonic oscillators and which can be characterized by multiple modes of excitations that have strong longitudinal couplings amongst themselves (e.g., the excitation of one mode can strongly shift the transition frequency of another mode). An example of such qubit can be a tunable coupler qubit (TCQ), which TCQ can be generally coupled between a superconducting qubit (e.g., the qubit to be measured) and a measurement subsystem. The measurement subsystem can comprise at least a resonator and a drive port.

As a result of use of the one or more embodiments described herein, the measurement pulse (signal input at the measurement drive port) has minimal or no affect on the superconducting qubit (data qubit), mediated by a non-zero coupling between the superconducting qubit and the readout resonator. In this way, leakage of the superconducting qubit is not caused by the measurement of a quantum state of the superconducting qubit. As a subsequent result, reduced quantum error correction can be necessary to account for error during measurement readout relative to the superconducting qubit.

Terminology

As used herein, the term "arranged on/at" can be understood in a broad sense and shall include embodiments according to which an intermediate layer, such as an insulating layer, can be arranged between a substrate/ground plane/ground and a respectively described layer/structure. Hence the terms "arranged on" and/or "arranged at" can comprise the meaning of "arranged above."

As used herein, the term "electronic chip" can refer to, but need not always refer to, a silicon chip. As used herein, the term "silicon chip" can refer to a chip comprising silicon and/or any other material.

As used herein, the terms "entity," "requesting entity" and "user entity" can refer to a machine, device, component, hardware, software, smart device and/or human.

As used herein, the terms "on" and "above" can be used in a context, as is customary, to indicate orientation or relative position in a vertical or orthogonal direction to the surface of the substrate, for example in a vertical z-direction.

General Description

One or more embodiments are now described with reference to the drawings, where like referenced numerals are used to refer to like elements throughout. In the following description, for purposes of explanation, numerous details are set forth in order to provide a more thorough understanding of the one or more embodiments. However, in various cases, that the one or more embodiments can be practiced without these details.

Generally, the subject computer processing system, methods, apparatuses, devices and/or computer program products can be employed to solve new problems that can arise through advancements in technology, computer networks and/or the Internet.

Further, the one or more embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Turning first generally to FIG. 1, one or more embodiments described herein can include one or more devices, systems and/or apparatuses that can facilitate executing one or more operations to facilitate generation of one or more qubit drive, excitation and/or readout pulses (e.g., signals, waveforms and/or wavelets). FIG. 1 illustrates a block diagram of an example, non-limiting system 100 that can facilitate operation of a quantum circuit such as by employing an electronic structure 113 according to the present disclosure. The electronic structure 113 can be employed at the readout electronics, waveform generator 110, logic circuit 108, quantum processor 106 and/or at any other suitable location of the quantum system 101, within and/or external to the cryogenic environment 116.

The following/aforementioned description refer to the operation of a single quantum program from a single quantum job request. This operation can include one or more readouts from cryogenic environment electronics within cryogenic chamber 116 by room temperature control/readout electronics 112 external to the cryogenic chamber 116. That is, one or more of the processes described herein can be scalable, also such as including additionally, and/or alternatively, execution of one or more quantum programs and/or quantum job requests in parallel with one another. Scalability can be enabled by employing electronic structures 113 in quantity.

In one or more embodiments, the non-limiting system 100 can be a hybrid system and thus can include both one or more classical systems, such as a quantum program implementation system, and one or more quantum systems, such as the quantum system 101. In one or more other embodiments, the quantum system 101 can be separate from, but function at least partially in parallel with, a classical system.

In such case, one or more communications between one or more components of the non-limiting system 100 and a classical system can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

In one or more other embodiments, the classical system can provide a quantum job request 104, qubit mapping and/or quantum circuit to be executed. Such classical system can analyze the one or more quantum measurement readouts 120. Further, such classical system can manage a queueing of quantum circuits to be operated on the one or more qubits of the quantum logic circuit of a respective quantum system 101.

Figure 10:
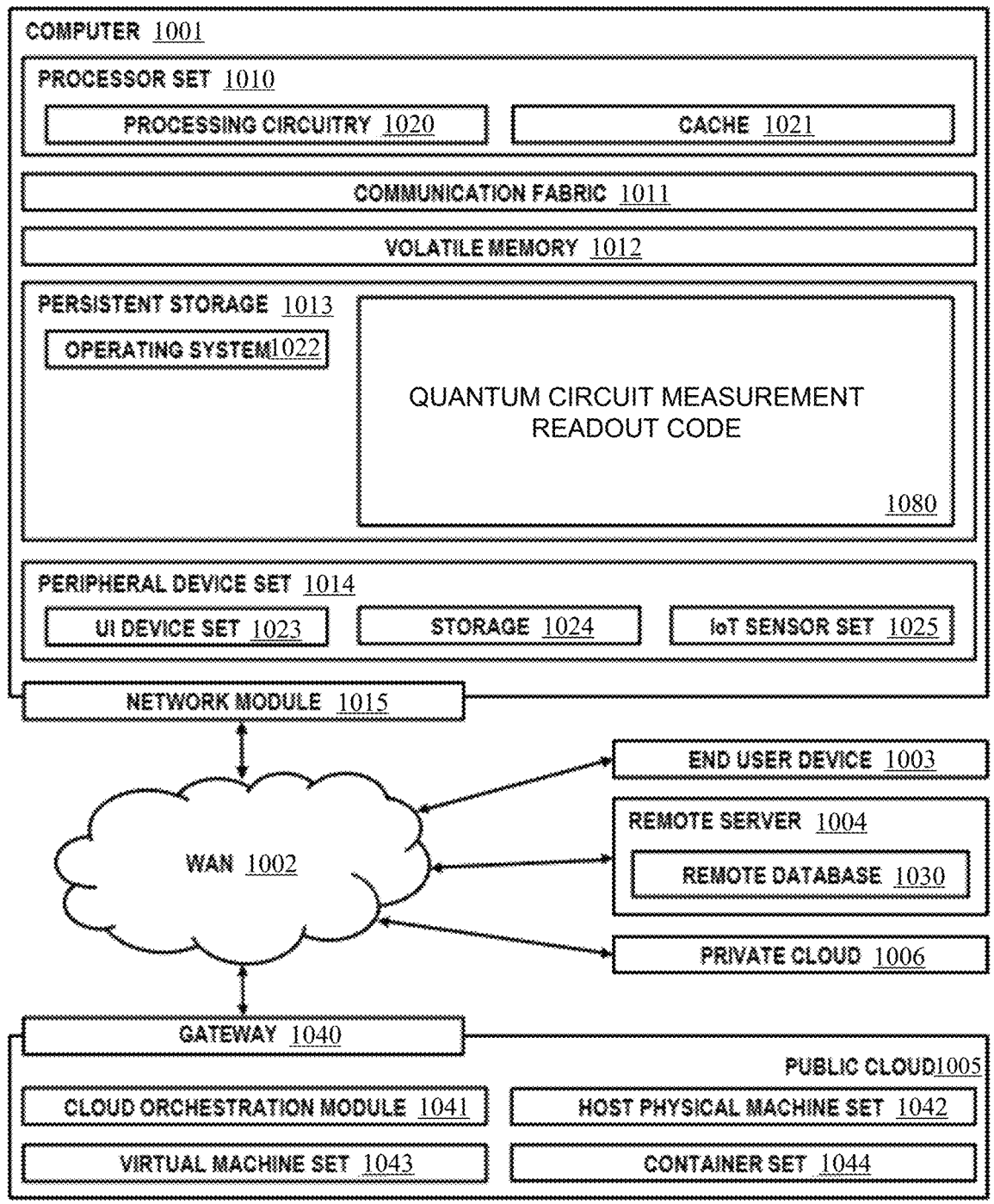
FIG. 10 illustrates a block diagram of example, non-limiting, computer environment in accordance with one or more embodiments described herein.

For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. In one or more described embodiments, computer and/or computing-based elements can be used in connection with implementing one or more of the systems, devices, components and/or computer-implemented operations shown and/or described in connection with FIG. 1 and/or with other figures described herein.

The quantum system 101 (e.g., quantum computer system and/or superconducting quantum computer system) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 120, can be responsive to the quantum job request 104 and associated input data and can be based at least in part on the input data, quantum functions and/or quantum computations.

As used herein, a quantum circuit can be a set of operations, such as gates, performed on a set of real-world physical qubits with the purpose of obtaining one or more qubit measurements. A quantum processor can comprise the one or more real-world physical qubits. Operation of a quantum circuit can be facilitated, such as by a waveform generator 110, to produce one or more physical pulses and/or other waveforms, signals and/or frequencies to alter one or more states of one or more of the physical qubits. The altered states can be measured, thus allowing for one or more computations to be performed regarding the qubits and/or the respective altered states. The waveform generator can be controlled, such as by a respective control stage.

In one or more embodiments, the quantum system 101 can comprise one or more quantum components, such as a quantum operation component 103, a quantum processor 106, quantum readout/control electronics 112, the waveform generator 110, electronic structure 113, and/or a quantum logic circuit 108 comprising one or more qubits (e.g., qubits 107A, 107B and/or 107C), also referred to herein as qubit devices 107A, 107B and 107C.

The quantum processor 106 can be any suitable processor. The quantum processor 106 can generate one or more instructions for controlling the one or more processes of the quantum logic circuit 108 and/or waveform generator 110.

The quantum operation component 103 can obtain (e.g., download, receive and/or search for) a quantum job request 104 requesting execution of one or more quantum programs. The quantum operation component 103 can determine one or more quantum logic circuits, such as the quantum logic circuit 108, for executing the quantum program. The request 104 can be provided in any suitable format, such as a text format, binary format and/or another suitable format. In one or more embodiments, the request 104 can be received by a component other than a component of the quantum system 101, such as a by a component of a classical system coupled to and/or in communication with the quantum system 101.

The waveform generator 110 can perform one or more waveform for operating and/or affecting one or more quantum circuits on the one or more qubits 107A, 107B and/or 107C. For example, the waveform generator 110 can operate one or more qubit effectors, such as qubit oscillators, harmonic oscillators and/or pulse generators to cause one or more pulses to stimulate and/or manipulate the state of the one or more qubits 107A, 107B and/or 107C comprised by the quantum system 101.

The waveform generator 110, such as at least partially in parallel with the quantum processor 106, can execute operation of a quantum logic circuit on one or more qubits of the circuit (e.g., qubit 107A, 107B and/or 107C). In response, the quantum operation component 103 can output one or more quantum job results, such as one or more quantum measurements 120, in response to the quantum job request 104.

The quantum logic circuit 108 and a portion or all of the waveform generator 110 and/or quantum processor 106 can be contained in a cryogenic environment, such as generated by a cryogenic chamber 116, such as a dilution refrigerator. Indeed, a signal can be generated by the waveform generator 110 to affect the one or more qubits 107A-C. Where qubits 107A, 107B and 107C are superconducting qubits, cryogenic temperatures, such as about 4K or lower can be employed to facilitate function of these physical qubits. Accordingly, the elements of the waveform generator 110 also can be constructed to perform at such cryogenic temperatures.

Employing the electronic structure 113, one or more physical qubit components (e.g., of the one or more qubits 107A, 107B and/or 107C) can have a quantum state thereof readout using the readout electronics 112 and/or waveform generator 110. The electronic structure 113 can generally allow for readout of such quantum state absent direct exchange coupling between the qubit 107A and a resonator of the electronic structure 113. It is noted that the electronic structure 113 can comprise the qubit 107A and/or be configured for being coupled to the qubit 107A. As noted above, absent the aforementioned direct exchange coupling, the qubit 107A can be measured without causing leakage of the qubit 107A. The electronic structure 113 can be configured for functioning in a cryogenic environment, such as provided by the cryogenic chamber 116, such as at temperatures in the milli-Kelvins (mK's). Differently, room temperature can be between 60 degrees Fahrenheit and 80 degrees Fahrenheit, such as about 70 degrees Fahrenheit.

Turning now to FIGS. 2-7, illustrated are varying embodiments of electronic structures formed during one or more stages of fabrication methods according to embodiments of the present disclosure. Such electronic structures can be employed as the electronic structure 113, as described above relative to a quantum system 101, and/or can be employed as an electronic structure for other suitable purposes, such as electronic payload purposes, signal-based purposes, control unit purposes, cryogenic and/or signal generating purposes.

Generally, each of the electronic structures discussed herein can comprise a substrate, such as a laminate and/or circuit board, an electronic chip comprising silicon (also herein referred to as a silicon chip) retained at the substrate, and a resonator. The electronic chip can comprise and/or be comprised by a TCQ. It will be appreciated that the electronic structures described herein can include and/or exclude a superconducting qubit (e.g., data qubit being measured).

Each electronic structure embodiment described below can comprise different aspects relative to one or more other embodiments, but one or more teachings described relative to any one electronic structure embodiment can be applied to any one or more other electronic structure embodiments.

The figures referenced each provide but single illustrations of electronic structures. Thus, in use, an electronic structure described can be scalable to include additional or fewer elements, larger and/or smaller relative dimensions and/or different component shapes.

Furthermore, any two or more of the embodiments described herein can be used at least partially in parallel with one another. For example, an electronic structure 200 can be employed at a same system (e.g., quantum system) as an electronic structure 600 and/or 700.

Figure 2:
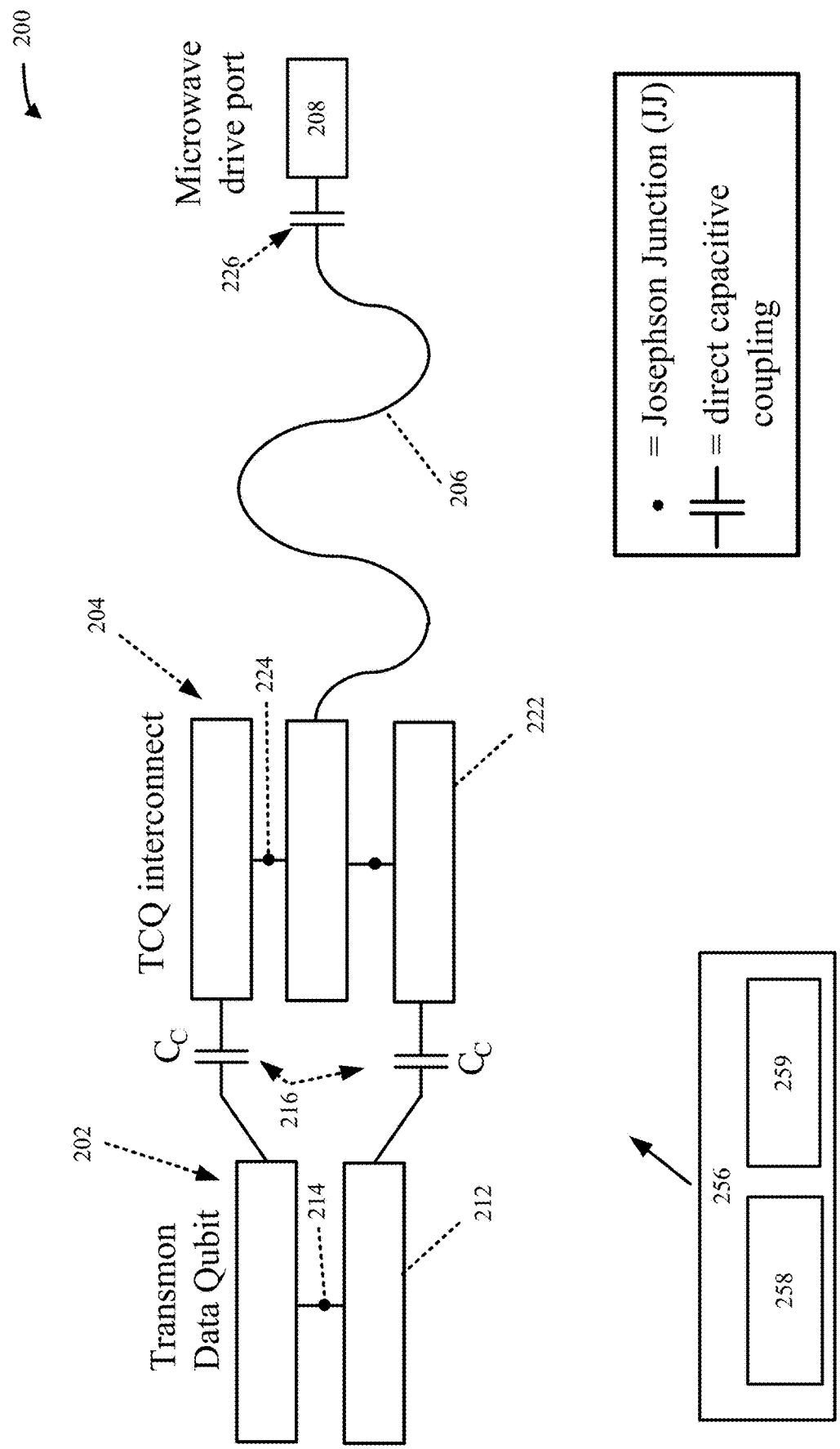
FIG. 2 illustrates an electronic structure, in accordance with one or more embodiments described herein.
Figure 6:
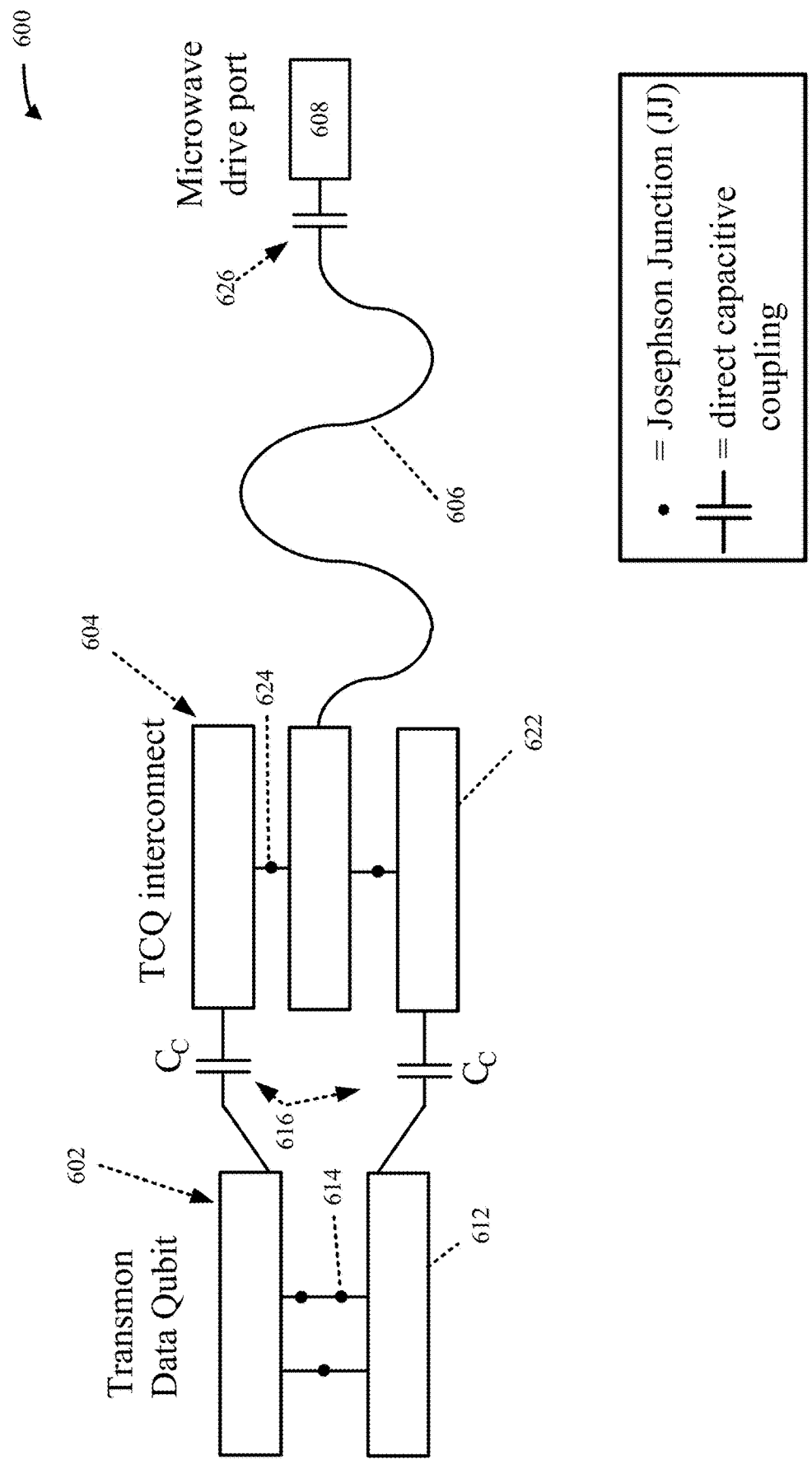
FIG. 6 illustrates another electronic structure, in accordance with one or more embodiments described herein.
Figure 7:
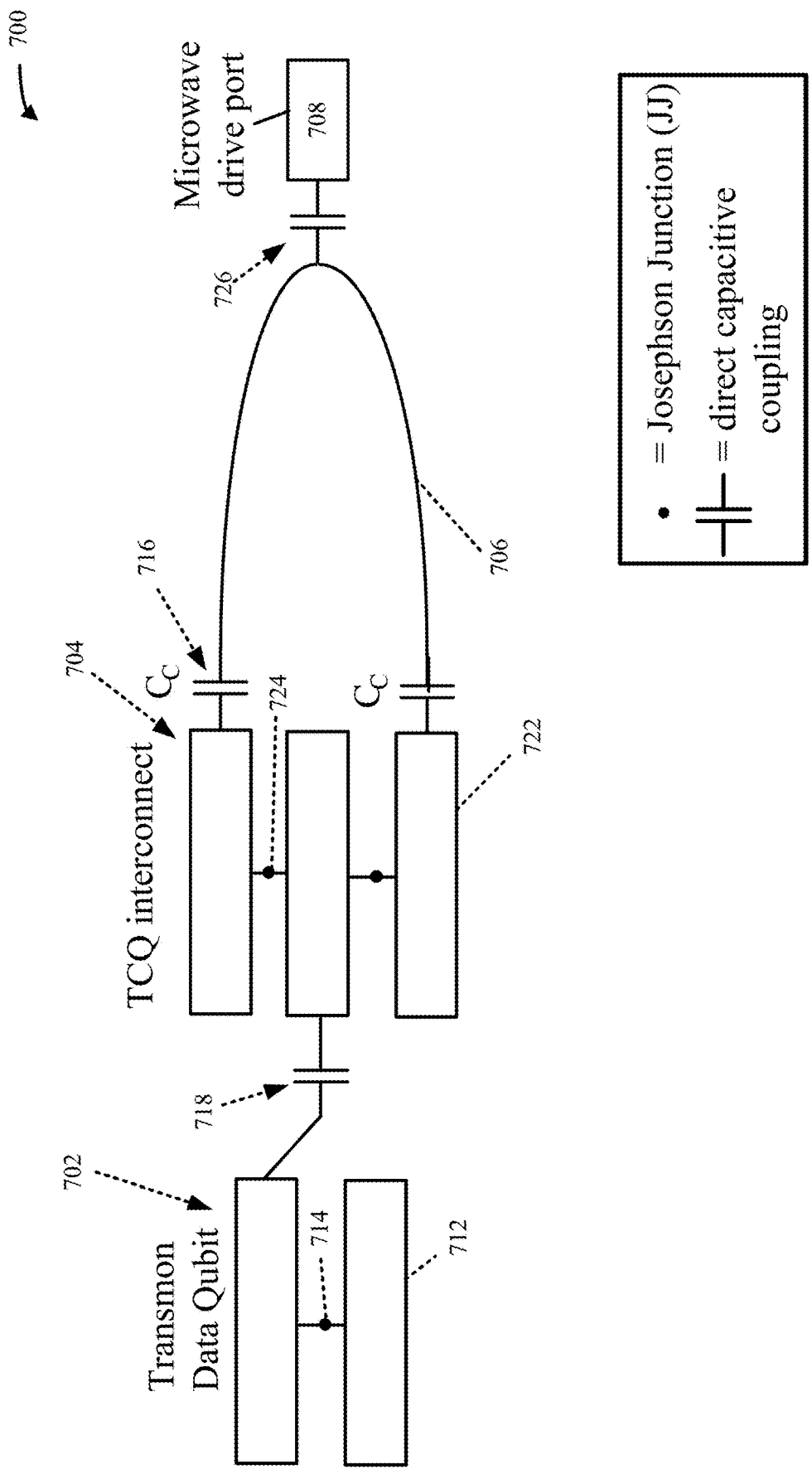
FIG. 7 illustrates still another electronic structure, in accordance with one or more embodiments described herein.

Turning now to FIG. 2, but applicable to the embodiments of FIGS. 6 and 7, in one or more embodiments, one or more operations for fabricating the one or more electronic structures described herein, such as the electronic structure 200, can be performed by a manufacturing system, such as a manufacturing system 256 (also herein referred to as fabrication system 256) comprising one or more manufacturing devices 258, where the manufacturing system 256 is operatively coupled to a processor 259 for at least partially controlling the one or more operations. The processor 259 can be any suitable processor. Discussion proved below with respect to processor 1010 can be at least partially equally applicable to the processor 259.

In one or more embodiments, the manufacturing system 256 can be configured, such as by one or more operations performed by one or more of the manufacturing devices 258 in view of one or more instructions provided by the processor 259, to construct the electronic structure 200, such as relative to and/or on a substrate. The one or more manufacturing devices 258 can, perform, among other operations, one or more deposition, transfer, etching, cutting, placement, removal, radiation, irradiation, adhesive operations, metallization operations, welding such as explosion welding, electroplating and/or other plating methods, component location and/or fastener attachment.

Turning next to FIGS. 2 to 5, an electronic structure 200 is illustrated. Electronic structure 200 can be configured to allow for measurement readout of a superconducting qubit without exchange coupling between the superconducting qubit and a respective readout resonator. As illustrated, the electronic structure 200 can comprise a superconducting qubit 202, a TCQ interconnect (also referred to herein as a TCQ 204), a readout resonator 206 and a drive port 208, among other features.

These elements can be provided at a same or any suitable number of different substrates. Generally, the superconducting qubit 202 and the TCQ 204 can be located in a cryogenic environment. The readout resonator 206 can be at least partially located in a cryogenic environment. Generally the drive port 208 can be disposed external to a cryogenic environment, but can be located in a cryogenic environment where suitable.

Referring first to the superconducting qubit 202, the superconducting qubit 202 is the data qubit that is being operated upon to execute a quantum program using the superconducting qubit 202 and one or more additional qubits. The superconducting qubit 202 can be a transmon qubit, another TCQ, a capacitively shunted flux qubit (CSFQ), and/or a fluxonium-type qubit. As illustrated, the superconducting qubit 202 comprises a pair of capacitor pads 212 coupled to one another by a Josephson Junction 214.

In one or more embodiments, the superconducting qubit 202 can be separate from, but coupled to the electronic structure 200, such as by direct coupling to the pair of coupling capacitors (Cc) 216.

The pair of coupling capacitors 216 directly couple the superconducting qubit 202 (the data qubit) to the TCQ 204. That is, a first capacitor pad 212 of the superconducting qubit 202 is directly coupled to a first capacitor pad 222 of the TCQ 204 by a first coupling capacitor 216. A second capacitor pad 212 of the superconducting qubit 202 is directly coupled to a second capacitor pad 222 of the TCQ 204 by a second coupling capacitor 216. The first and second coupling capacitors 216 are not directly coupled to one another.

The TCQ 204 can comprise a set of three capacitor pads 222, can be tunable, and further can allow for operation of both an A mode and a B mode of the TCQ 204. These two modes of excitation can provide for separate ways of exciting the TCQ 204 and passively exist together.

Figure 3:
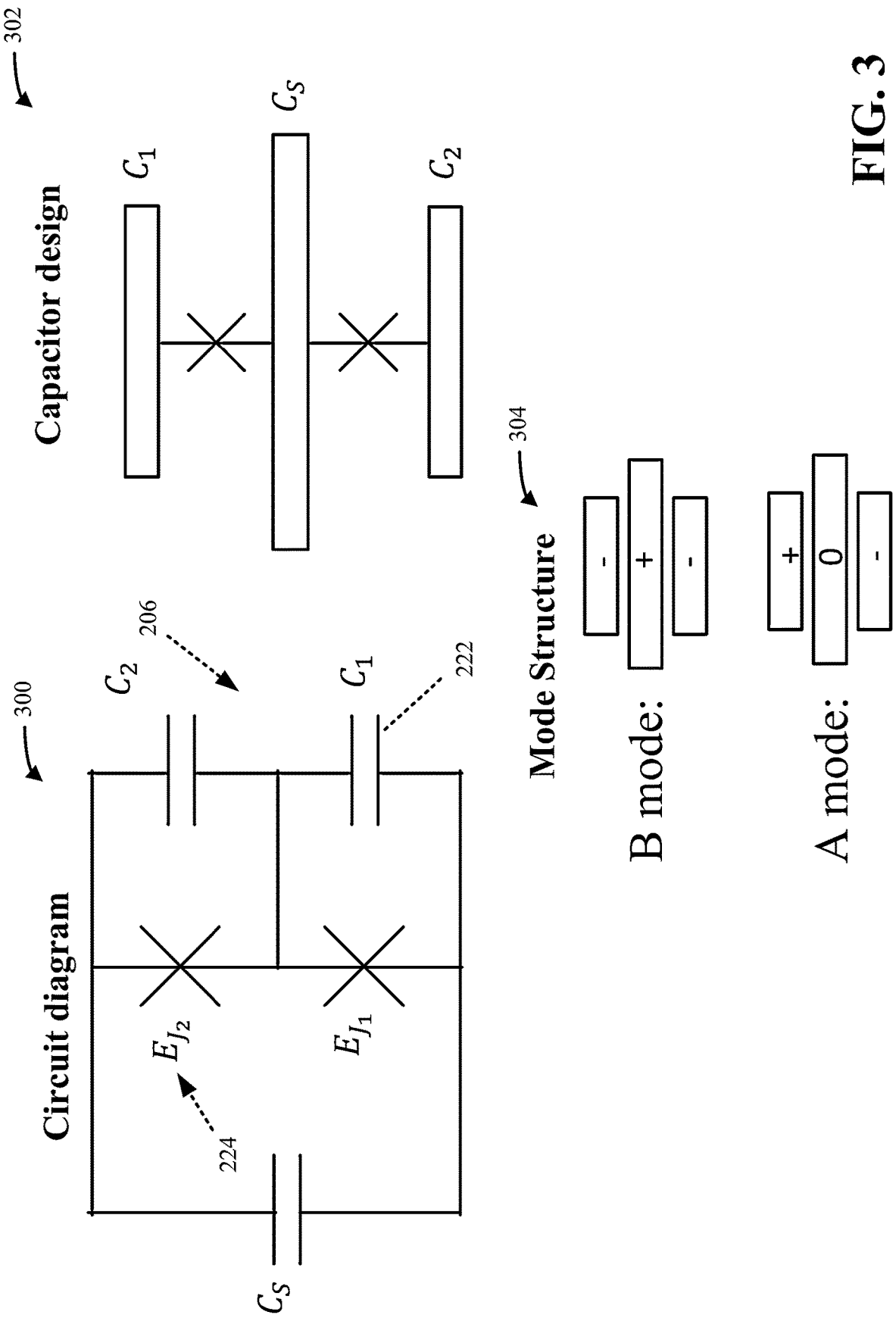
FIG. 3 illustrates a set of three diagrams demonstrating use of a multi-mode qubit interconnect, and particularly a tunable coupler qubit (TCQ), in accordance with one or more embodiments described herein.

Referring next briefly to FIG. 3, a set of three diagrams illustrate further information regarding the TCQ 204. The circuit diagram 302 provides a first view of the three capacitor pads 222 (here $C_S$, $C_1$ and $C_2$) coupled together in series and coupled together by a pair of Josephson Junctions 224. The Josephson Junctions 224 are capacitively coupled in series. Diagram 304 illustrates a capacitor design for the TCQ 204. Diagram 304 separately illustrates the B mode and the A mode of the TCQ 204. These two modes correspond to symmetric and antisymmetric combinations of excitations associated with the two Josephson Junctions 224 of the TCQ 204. The B mode is higher in frequency than the A mode. The B mode can be considered a dark mode because it has no net dipole moment.

Turning back to FIG. 2, as will be further explained, symmetry of the illustrated electronic structure 200 can allow for exchange interactions between the resonator 206 and the superconducting qubit 202 to be cancelled out. That is, there is no exchange coupling between the superconducting qubit 202 and the resonator 206. To provide for this benefit, the coupling capacitors 216 have equal values, such as in a range of about 5 femto-farads to about 100 femto-farads, such as about 10 femto-farads (fF). That is, the pair of coupling capacitors 216 provide for circuit symmetry thus ensuring that the superconducting qubit 202 has exchange coupling only to the A mode of the TCQ 204 and not to the resonator 206.

The resonator 206 can be a waveguide resonator, such as a coplanar waveguide resonator or, alternatively, a lumped element resonator comprising of a single inductor and single capacitor. The resonator 206 can be disposed at a same substrate as the TCQ 204 or different substrate. A first end of the resonator 206 is coupled to the central capacitor pad 222 of the TCQ 204. The central capacitor pad 222 ($C_s$) is coupled is series with the pair of Josephson Junctions 224. That is, the B mode of the TCQ 204 is strongly coupled to the resonator 206 such as by galvanic or capacitive connection. A second and opposite end of the resonator 206 is coupled to a drive port 208. As used here, "strongly" can refer to exchange coupling being 100 mega-Hertz (MHz) or more.

The drive port 208, such as a microwave drive port, can be capacitively or inductively coupled by a coupling 226 to the resonator 206. In an embodiment, a capacitor provides the coupling 226. In one or more embodiments, the drive port 208 can be separate from, but coupled to the electronic structure 200, with the resonator 206 coupled to the drive port 208 by coupling 226, either by a capacitor and/or by relative distance between the resonator 206 and drive port 208 for inductive coupling allowance.

It is appreciated that a second drive port (not shown) can be separately coupled to the superconducting qubit 202 (e.g., by a drive line not shown) to allow for driving of the superconducting qubit 202 (e.g., excitation of the superconducting qubit 202) via use of a suitable waveform generator.

In view of the above construction, due to a strong longitudinal coupling between the A mode and the B mode of the TCQ 204, there is provided longitudinal coupling between the superconducting qubit 202 and the resonator 206 to allow for readout, such as conventional dispersive readout, of a qubit state of the superconducting qubit 202.

Figure 4:
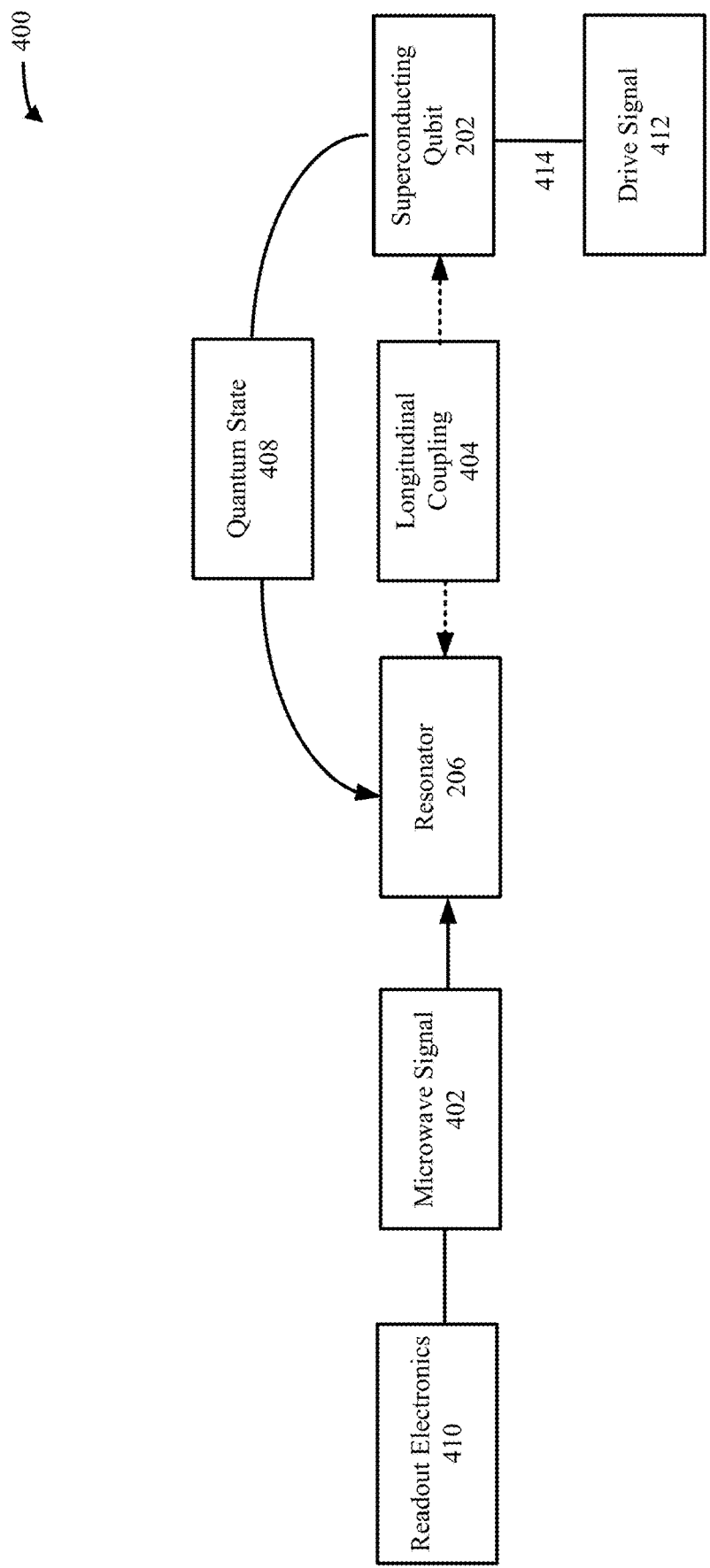
FIG. 4 illustrates a diagram of a partial process flow of use of the electronic structure of FIG. 2, in accordance with one or more embodiments described herein.

Referring next to FIG. 4, a summary of use of the electronic structure 200 is illustrated at a schematic diagram 400. As shown, a microwave signal 402 is received, such as from the microwave drive port 208, at the resonator 206. The longitudinal coupling 404 between the resonator 206 and the superconducting qubit 202 (data qubit) allow for dispersive readout of a quantum state 408 of the superconducting qubit 202. Use of the symmetrically disposed and valued coupling capacitances 216 cancel out the readout signal from the microwave drive port 208, and the configuration of the electronic structure 200 prevents exchange coupling between the superconducting qubit 202 and the resonator 206. Data of the quantum state 408 is thus read back, via the microwave drive port 208, by suitable readout electronics 410 coupled to the microwave drive port 208. A drive signal 412 can be separately applied to the superconducting qubit 202 to drive (e.g., to excite) the superconducting qubit 202 via a charge line 414 separate from the microwave drive port 208.

Figure 5:
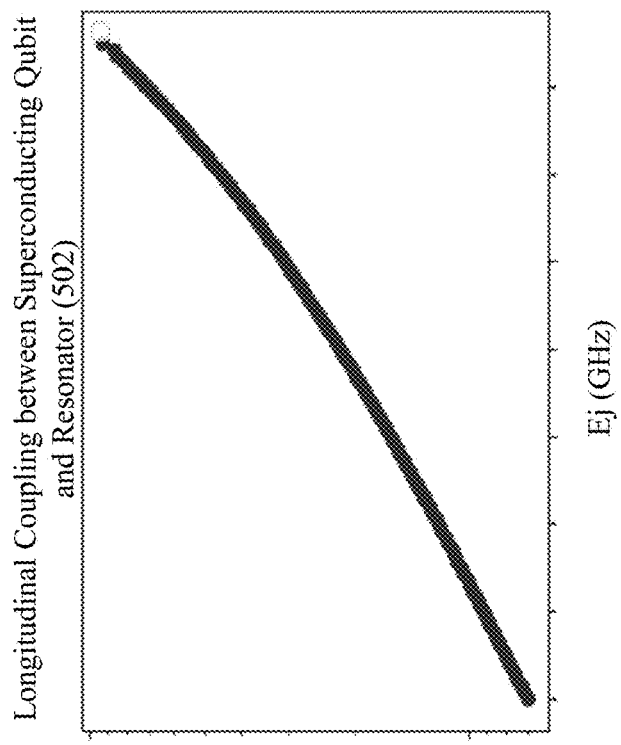
FIG. 5 is a pair of graphs illustrating use of the electronic structure of FIG. 2, in accordance with one or more embodiments described herein.
Figure 5:
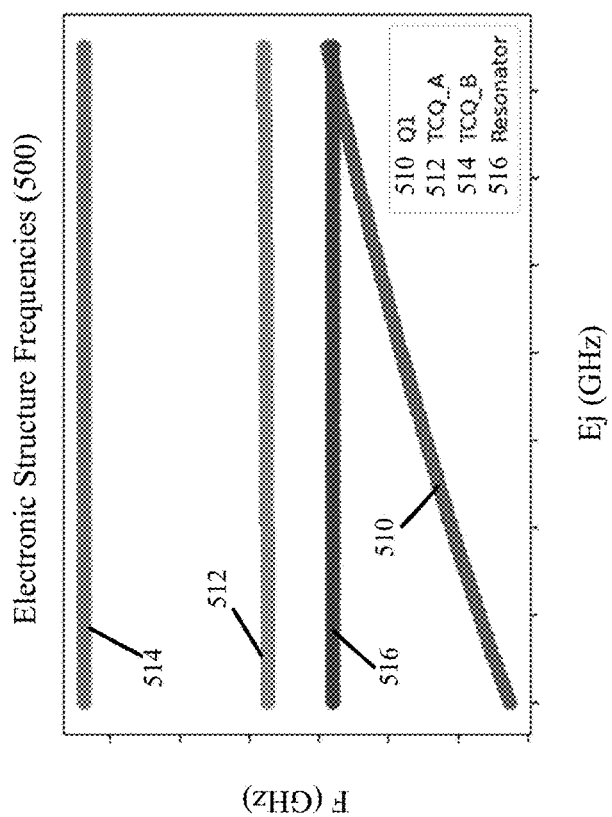

At FIG. 5, a pair of graphs 500 and 502 are illustrated that demonstrate further information relative to the electronic structure 200, but can be applicable to the electronic structures 600 and 700 of FIGS. 6 and 7, respectively.

As shown, graph 500 generally illustrates energy levels of the qubit (Q1), the A and B modes of the TCQ and the resonator. These energy levels are plotted as a function of the Josephson energy of the transmon. Specifically, graph 500 illustrates frequencies of the Q1 qubit (510), of the A mode (512) of the TCQ 204, of the B mode (514) of the TCQ 204, and of the resonator 206 (516). Frequency is graphed against the Josephson energy ($E_j$) of the Josephson Junction 214 of the superconducting qubit 202. The Josephson energy can be measured in gigahertz (GHz).

Graph 502 illustrates longitudinal coupling (ZZ) between the superconducting qubit 202 and the resonator 206. Longitudinal coupling (ZZ) can be measured in kilohertz (kHz). Longitudinal coupling (ZZ) is graphed against the Josephson energy (Ej) of the Josephson Junction 214 of the superconducting qubit 202. As shown, longitudinal coupling increases, such as generally linearly with an increase in the Josephson energy (Ej) of the Josephson Junction 214 of the superconducting qubit 202. In one or more embodiments, a longitudinal coupling of greater than 100 kHz can be achievable.

Turning now to FIG. 6, another embodiment of an electronic structure for use as the electronic structure 113 is illustrated at 600. Description provided above relative to the electronic structure 200 of FIG. 2 also can apply to the electronic structure 600 of FIG. 6. Indeed, the configurations of the electronic structures 200 and 600 are generally similar except that the superconducting qubit 202 is represented as a transmon qubit while the superconducting qubit 602 is represented as a CSFQ.

Electronic structure 600 can be configured to allow for measurement readout of a superconducting qubit without exchange coupling between the superconducting qubit and a respective readout resonator. As illustrated, the electronic structure 600 can comprise a superconducting qubit 602, a TCQ interconnect (also referred to herein as a TCQ 604), a readout resonator 606 and a drive port 608, among other features.

These elements can be provided at a same or any suitable number of different substrates. Generally, the superconducting qubit 602 and the TCQ 604 can be located in a cryogenic environment. The readout resonator 606 can be at least partially located in a cryogenic environment. Generally the drive port 608 can be disposed external to a cryogenic environment, but can be located in a cryogenic environment where suitable.

Referring first to the superconducting qubit 602, the superconducting qubit 602 is the data qubit that is being operated upon to execute a quantum program using the superconducting qubit 202 and one or more additional qubits. The superconducting qubit 602 is particularly illustrated as a capacitively shunted flux qubit (CSFQ). As illustrated, the superconducting qubit 602 comprises a pair of capacitor pads 612 coupled to one another by a Josephson Junction 614 and further by a second pair of series-connected Josephson Junctions 614.

In one or more embodiments, the superconducting qubit 602 can be separate from, but coupled to the electronic structure 600, such as by direct coupling to the pair of coupling capacitors (Cc) 616.

The pair of coupling capacitors 616 directly couple the superconducting qubit 602 (the data qubit) to the TCQ 604. That is, a first capacitor pad 612 of the superconducting qubit 602 is directly coupled to a first capacitor pad 622 of the TCQ 604 by a first coupling capacitor 616. A second capacitor pad 612 of the superconducting qubit 602 is directly coupled to a second capacitor pad 622 of the TCQ 604 by a second coupling capacitor 616. The first and second coupling capacitors 616 are not directly coupled to one another.

The TCQ 604 can comprise a set of three capacitor pads 622, can be tunable, and further can allow for operation of both an A mode and a B mode of the TCQ 604. These two modes of excitation can provide for separate ways of exciting the TCQ 604 and passively exist together.

Symmetry of the illustrated electronic structure 600 can allow for exchange interactions between the resonator 606 and the superconducting qubit 602 to be cancelled out. That is, there is no exchange coupling between the superconducting qubit 602 and the resonator 606. To provide for this benefit, the coupling capacitors 616 have equal values, such as in a range of about 5 femto-farads to about 100 femto-farads, such as about 10 femto-farads (fF). That is, the pair of coupling capacitors 616 provide for circuit symmetry thus ensuring that the superconducting qubit 602 has exchange coupling only to the A mode of the TCQ 604 and not to the resonator 606.

The resonator 606 can be a waveguide resonator, such as a coplanar waveguide resonator or, alternatively, a lumped element resonator comprising a single inductor and a single capacitor. The resonator 606 can be disposed at a same substrate as the TCQ 604 or different substrate. A first end of the resonator 606 is coupled to the central capacitor pad 622 of the TCQ 604. The central capacitor pad 622 ($C_s$) is coupled is series with the pair of Josephson Junctions 624. That is, the B mode of the TCQ 604 is strongly coupled to the resonator 606 such as by galvanic or capacitive connection. A second and opposite end of the resonator 606 is coupled to a drive port 608. As used here, "strongly" can refer to exchange coupling being 100 mega-Hertz (MHz) or more.

The drive port 608, such as a microwave drive port, can be capacitively or inductively coupled by a coupling 626 to the resonator 606. In an embodiment, a capacitor provides the coupling 626. In one or more embodiments, the drive port 608 can be separate from, but coupled to the electronic structure 600, with the resonator 606 coupled to the drive port 608 by coupling 626, either by a capacitor and/or by relative distance between the resonator 606 and drive port 608 for inductive coupling allowance.

It is appreciated that a second drive port (not shown) can be separately coupled to the superconducting qubit 602 (e.g., by a drive line not shown) to allow for driving of the superconducting qubit 602 (e.g., excitation of the superconducting qubit 602) via use of a suitable waveform generator.

In view of the above construction, due to a strong longitudinal coupling between the A mode and the B mode of the TCQ 604, there is provided longitudinal coupling between the superconducting qubit 602 and the resonator 606 to allow for readout, such as conventional dispersive readout, of a qubit state of the superconducting qubit 602. That is, the superconducting qubit 602 is prevented from leaking out of the computation basis by a microwave pulse provided at the drive port 608. Use of a CSFQ as the superconducting qubit 602 does not counter this prevention of leakage.

Turning next to FIG. 7, another embodiment of an electronic structure for use as the electronic structure 113 is illustrated at 700. Description provided above relative to the electronic structure 200 of FIG. 2 also can apply to the electronic structure 700 of FIG. 7.

Electronic structure 700 can be configured to allow for measurement readout of a superconducting qubit without exchange coupling between the superconducting qubit and a respective readout resonator. As illustrated, the electronic structure 700 can comprise a superconducting qubit 702, a TCQ interconnect (also referred to herein as a TCQ 704), a readout resonator 706 and a drive port 708, among other features.

These elements can be provided at a same or any suitable number of different substrates. Generally, the superconducting qubit 702 and the TCQ 704 can be located in a cryogenic environment. The readout resonator 706 can be at least partially located in a cryogenic environment. Generally the drive port 708 can be disposed external to a cryogenic environment, but can be located in a cryogenic environment where suitable.

Referring first to the superconducting qubit 702, the superconducting qubit 702 is the data qubit that is being operated upon to execute a quantum program using the superconducting qubit 702 and one or more additional qubits. The superconducting qubit 702 can be a transmon qubit, another TCQ, a capacitively shunted flux qubit (CSFQ), and/or a fluxonium-type qubit. As illustrated, the superconducting qubit 702 comprises a pair of capacitor pads 712 coupled to one another by a Josephson Junction 714.

In one or more embodiments, the superconducting qubit 702 can be separate from, but coupled to the electronic structure 700, such as by direct coupling by the coupling capacitor 718. As illustrated, the capacitor 718 is directly coupled to the center pad of the TCQ 704 but can be directly coupled to either capacitor pad 712 of the superconducting qubit 702. In one or more other embodiments, either capacitor pad 712 of the superconducting qubit 702 can be galvanically coupled to the center capacitor pad 722 of the TCQ 704.

The TCQ 704 can comprise a set of three capacitor pads 722, can be tunable, and further can allow for operation of both an A mode and a B mode of the TCQ 704. These two modes of excitation can provide for separate ways of exciting the TCQ 704 and passively exist together.

The pair of coupling capacitors 716 directly couple the resonator 706 to the TCQ 704. That is, a first capacitor pad 722 of the TCQ 704 is directly coupled to a first end of the resonator 706 by a first coupling capacitor 716. A second capacitor pad 722 of the TCQ 704 is directly coupled to a second end of the resonator 706 by a second coupling capacitor 716. The first and second coupling capacitors 716 are not directly coupled to one another.

Symmetry of the illustrated electronic structure 700 can allow for exchange interactions between the resonator 706 and the superconducting qubit 702 to be cancelled out. That is, there is no exchange coupling between the superconducting qubit 702 and the resonator 706. To provide for this benefit, the coupling capacitors 716 have equal values, such as in a range of about 5 femto-farads to about 100 femto-farads, such as about 10 femto-farads (fF). That is, the pair of coupling capacitors 716 provide for circuit symmetry thus ensuring that the resonator has exchange coupling only to the A mode of the TCQ 604 and not to the superconducting qubit 702.

Indeed, relative to the electronic structure 200 of FIG. 2, it is noted that the roles of the A mode and the B mode of the TCQ 704 are reversed. This is generally illustrated at the electronic structure 700. That is, differential coupling can be employed to couple the readout resonator 706 to the A mode of the respective TCQ 704. Direct capacitive coupling can be employed to couple the TCQ 704 and the superconducting qubit 702 to provide for selective coupling between the superconducting qubit 702 and the B mode of the TCQ 704. Differently at FIG. 2, the B mode of the TCQ 204 is strongly coupled to the resonator 206, with the A mode of the TCQ 204 being strongly coupled to the superconducting qubit 202. It is noted that the different couplings of the A and B modes of the electronic structure 700, as compared to the electronic structures 200 and 600, still allows for prevention of leakage of the superconducting qubit 702 from the microwave pulse provided at the drive port 708.

Turning next to the resonator 706, the resonator 706 can be a waveguide resonator, such as a coplanar waveguide resonator or, alternatively, a lumped element resonator comprising a single inductor and a single capacitor. The resonator 706 can be disposed at a same substrate as the TCQ 704 or different substrate.

The drive port 708, such as a microwave drive port, can be capacitively or inductively coupled by a coupling 726 to the resonator 706. In an embodiment, a capacitor provides the coupling 726. In one or more embodiments, the drive port 708 can be separate from, but coupled to the electronic structure 700, with the resonator 706 coupled to the drive port 708 by coupling 726, either by a capacitor and/or by relative distance between the resonator 706 and drive port 708 for inductive coupling allowance.

It is appreciated that a second drive port (not shown) can be separately coupled to the superconducting qubit 702 (e.g., by a drive line not shown) to allow for driving of the superconducting qubit 702 (e.g., excitation of the superconducting qubit 702) via use of a suitable waveform generator.

In view of the above construction, due to a strong longitudinal coupling between the A mode and the B mode of the TCQ 704, there is provided longitudinal coupling between the superconducting qubit 702 and the resonator 706 to allow for readout, such as conventional dispersive readout, of a qubit state of the superconducting qubit 702. That is, the superconducting qubit 702 is prevented from leaking out of the computation basis by a microwave pulse provided at the drive port 708.

Figure 8:
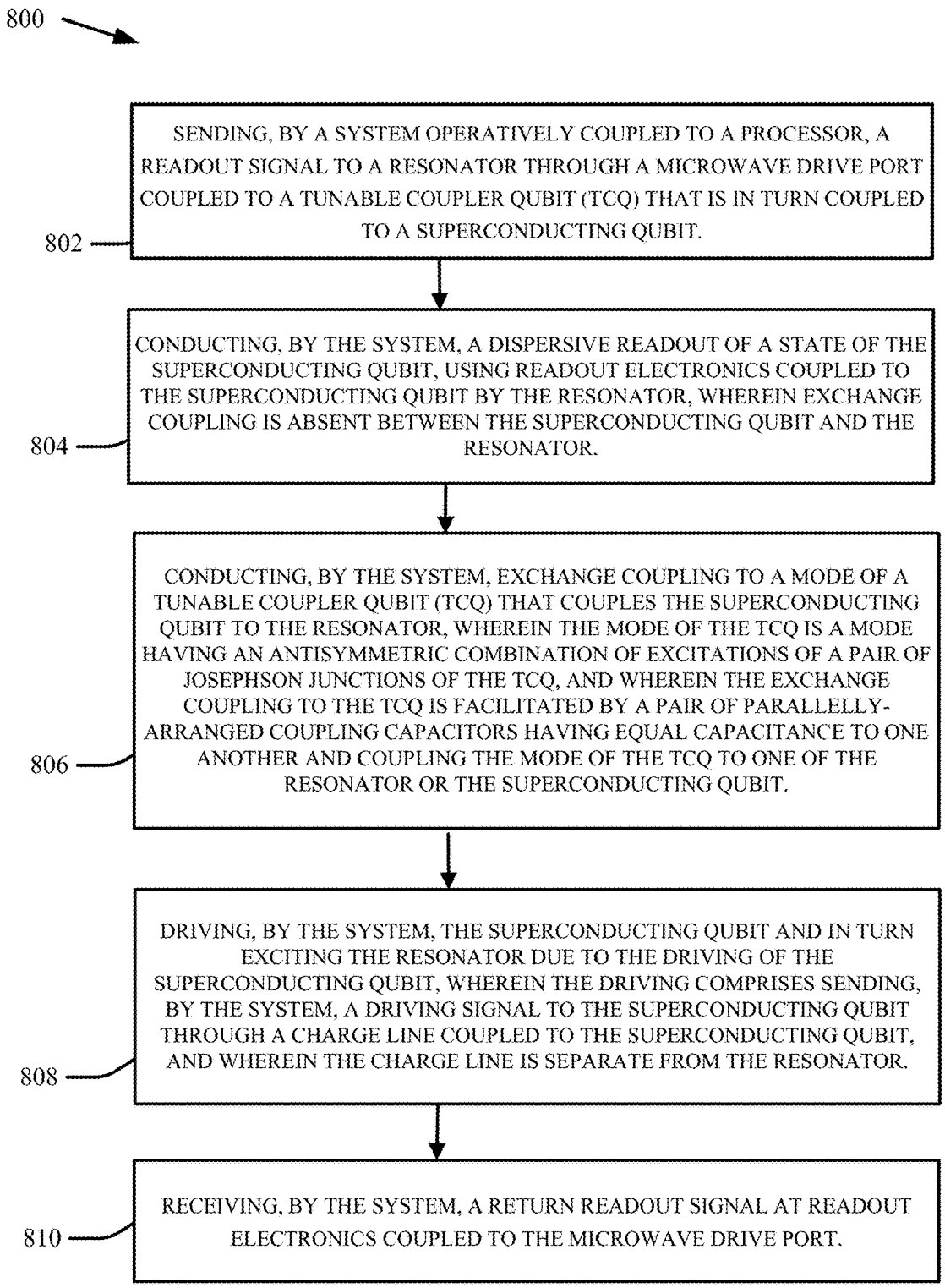
FIG. 8 illustrates a flow diagram of an example method of fabrication of an electronic system, in accordance with one or more embodiments described herein.

Referring next to FIG. 8, illustrated is a flow diagram of an example, non-limiting method 800 that can provide a process to use an electronic structure, such as the electronic structure 200, in accordance with one or more embodiments described herein. While the non-limiting method 800 is described relative to the electronic structure 200 of FIG. 2, the non-limiting method 800 can be applicable also to other systems described herein, such as any of the electronic structures 600 and/or 700. Repetitive description of like elements and/or processes employed in respective embodiments is omitted for the sake of brevity.

At 802, the non-limiting method 800 can comprise sending, by a system operatively coupled to a processor (e.g., quantum waveform generator 110 and/or readout electronics 112), a readout signal to a resonator through a microwave drive port coupled to a tunable coupler qubit (TCQ) that is in turn coupled to a superconducting qubit.

At 804, the non-limiting method 800 can comprise conducting, by the system (e.g., readout electronics 112), a dispersive readout of a state of the superconducting qubit, using readout electronics coupled to the superconducting qubit by the resonator, wherein exchange coupling is absent between the superconducting qubit and the resonator.

At 806, the non-limiting method 800 can comprise conducting, by the system (e.g., electronic structure 200), exchange coupling to a mode of a tunable coupler qubit (TCQ) that couples the superconducting qubit to the resonator, wherein the mode of the TCQ is a mode having an antisymmetric combination of excitations of a pair of Josephson junctions of the TCQ, and wherein the exchange coupling to the TCQ is facilitated by a pair of parallelly-arranged coupling capacitors having equal capacitance to one another and coupling the mode of the TCQ to one of the resonator or the superconducting qubit.

At 808, the non-limiting method 800 can comprise driving, by the system (e.g., waveform generator 110), the superconducting qubit and in turn exciting the resonator due to the driving of the superconducting qubit, wherein the driving comprises sending, by the system (e.g., waveform generator), a driving signal to the superconducting qubit through a charge line coupled to the superconducting qubit, and wherein the charge line is separate from the resonator.

At 810, the non-limiting method 800 can comprise receiving, by the system (e.g., readout electronics 112), a return readout signal at readout electronics coupled to the microwave drive port.

Figure 9:
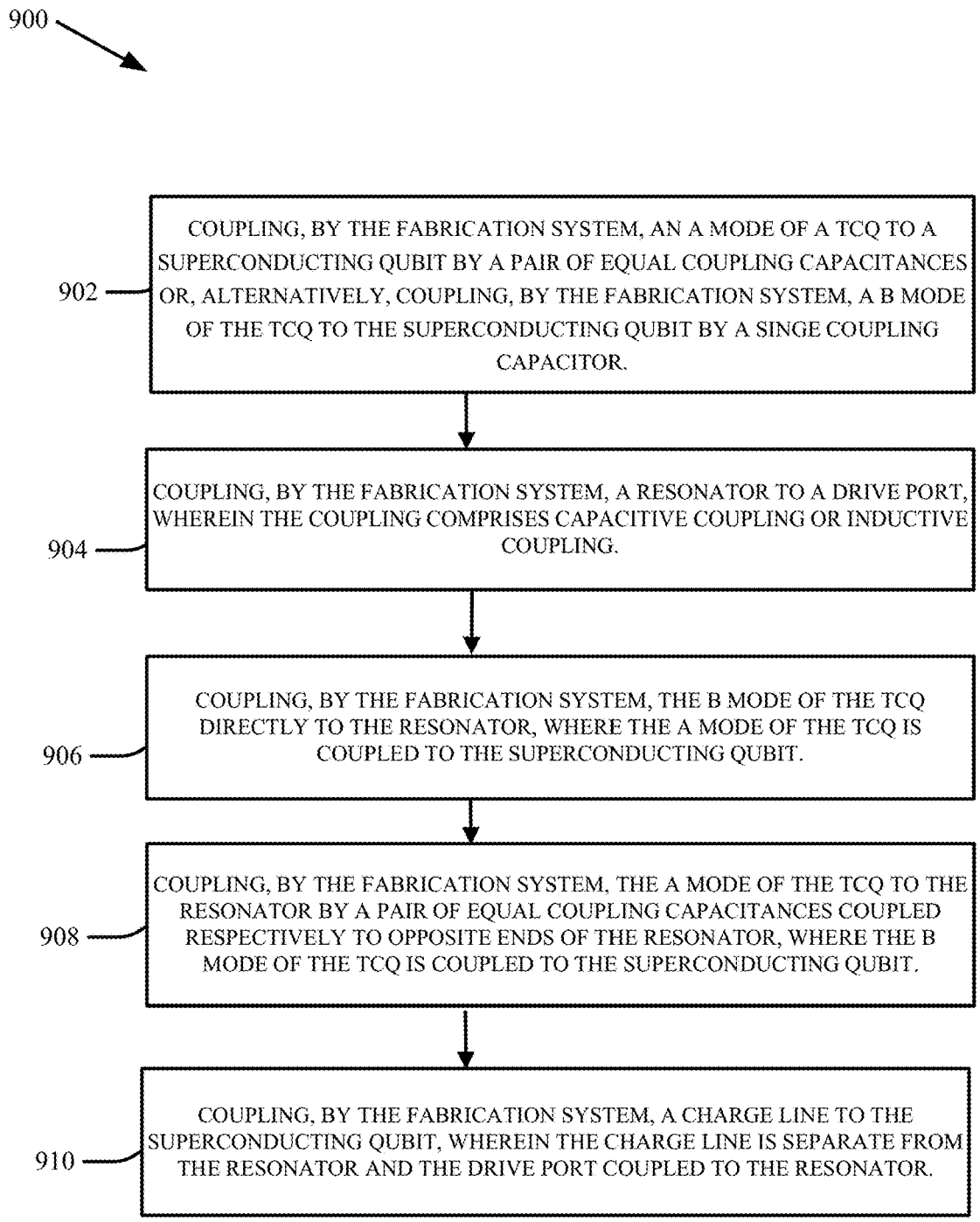
FIG. 9 illustrates a flow diagram of an example method of use of an electronic system, in accordance with one or more embodiments described herein.

Referring next to FIG. 9, illustrated is a flow diagram of an example, non-limiting method 900 that can provide a process to fabricate an electronic structure, such as the electronic structure 200, in accordance with one or more embodiments described herein. While the non-limiting method 900 is described relative to the electronic structure 200 of FIG. 2, the non-limiting method 900 can be applicable also to other systems described herein, such as any of the electronic structures 600 and/or 700. Repetitive description of like elements and/or processes employed in respective embodiments is omitted for sake of brevity.

At 902, the non-limiting method 900 can comprise coupling, by the fabrication system (e.g., fabrication system 256), an A mode of a TCQ to a superconducting qubit by a pair of equal coupling capacitances or, alternatively, coupling, by the fabrication system (e.g., fabrication system 256), a B mode of the TCQ to the superconducting qubit by a single coupling capacitor.

At 904, the non-limiting method 900 can comprise coupling, by the fabrication system (e.g., fabrication system 256), a resonator to a drive port, wherein the coupling comprises capacitive coupling or inductive coupling.

At 906, the non-limiting method 900 can comprise coupling, by the fabrication system (e.g., fabrication system 256), the B mode of the TCQ directly to the resonator, where the A mode of the TCQ is coupled to the superconducting qubit.

At 908, the non-limiting method 900 can comprise coupling, by the fabrication system (e.g., fabrication system 256), the A mode of the TCQ to the resonator by a pair of equal coupling capacitances coupled respectively to opposite ends of the resonator, where the B mode of the TCQ is coupled to the superconducting qubit.

At 910, the non-limiting method 900 can comprise coupling, by the fabrication system (e.g., fabrication system 256), a charge line to the superconducting qubit, wherein the charge line is separate from the resonator and the drive port coupled to the resonator.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

Additional Description

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more electronic systems, electronic structures and/or methods provided herein relate to quantum state measurement while suppressing measurement-induced state transition in a superconducting qubit. An electronic system can comprise a superconducting qubit coupled to a tunable coupler qubit (TCQ), and a microwave drive port coupled to the TCQ.

A resonator can be coupled between the TCQ and the microwave drive port. The resonator can be coupled to the microwave drive port by direct capacitive coupling or inductive coupling. The superconducting qubit can be coupled to the TCQ by a pair of parallelly-arranged coupling capacitors having equal capacitance to one another, or the resonator can be coupled to the TCQ by a pair of parallelly-arranged coupling capacitors having equal capacitance to one another.

An electronic system comprises a superconducting qubit coupled to a tunable coupler qubit (TCQ), and a microwave drive port coupled to the TCQ.

The electronic system of the above paragraph, wherein a resonator is coupled between the TCQ and the microwave drive port.

The electronic system of any of the above paragraphs, wherein the resonator is coupled to the microwave drive port by direct capacitive coupling.

The electronic system of any of the above paragraphs, wherein the resonator is coupled to the microwave drive port by inductive coupling.

The electronic system of any of the above paragraphs, wherein the superconducting qubit is coupled to the TCQ by a pair of parallelly-arranged coupling capacitors having equal capacitance to one another, or wherein the resonator is coupled to the TCQ by a pair of parallelly-arranged coupling capacitors having equal capacitance to one another.

The electronic system of any of the above paragraphs, absent exchange coupling between the superconducting qubit and the resonator.

The electronic system of any of the above paragraphs, further comprising a charge line separate from the resonator and coupled to the superconducting qubit, wherein the charge line is configured to receive signals for driving the superconducting qubit.

An electronic structure comprises a superconducting qubit coupled to a tunable coupler qubit (TCQ), and a resonator coupled to the TCQ and configured to be coupled to a microwave drive port.

The electronic structure of the above paragraph, wherein the superconducting qubit is a transmon qubit, and wherein the resonator is a coplanar waveguide resonator.

The electronic structure of any of the above paragraphs, wherein the TCQ comprises a set of three capacitor pads coupled in series to one another, and wherein the superconducting qubit comprises a first capacitor pad and a second capacitor pad.

The electronic structure of any of the above paragraphs, wherein the resonator is coupled to a central capacitor pad of the TCQ, of the set of three capacitor pads.

The electronic structure of any of the above paragraphs, wherein the first capacitor pad is coupled to a first outer capacitor pad of the TCQ, of the set of three capacitor pads, and wherein the second capacitor pad is coupled to a second outer capacitor pad of the TCQ, of the set of three capacitor pads.

The electronic structure of any of the above paragraphs, wherein the first capacitor pad is coupled to the first outer capacitor pad of the TCQ by a first direct capacitive coupling, and wherein the second capacitor pad is coupled to the second outer capacitor pad of the TCQ by a second direct capacitive coupling.

The electronic structure of any of the above paragraphs, wherein the first direct capacitive coupling and the second direct capacitive coupling each comprise a coupling capacitor having equal capacitance to on another.

The electronic structure of any of the above paragraphs, wherein the resonator is coupled to a first outer capacitor pad of the TCQ, of the set of three capacitor pads, and to a second outer capacitor pad of the TCQ, of the set of three capacitor pads.

The electronic structure of any of the above paragraphs, wherein the first capacitor pad or the second capacitor pad is coupled to a central capacitor pad of the TCQ, of the three capacitor pads.

The electronic structure of any of the above paragraphs, wherein the first capacitor pad or the second capacitor pad is coupled to the central capacitor pad of the TCQ by direct capacitive coupling, wherein the first outer capacitor pad of the TCQ is coupled to the resonator by a first direct capacitive coupling, and wherein the second outer capacitor pad of the TCQ is coupled to the resonator by a second direct capacitive coupling.

The electronic structure of any of the above paragraphs, wherein the first direct capacitive coupling and the second direct capacitive coupling each comprise a coupling capacitor having equal capacitance to one another.

An electronic system comprises a superconducting qubit coupled to a resonator that is in turn coupled to a microwave drive port of readout electronics of a qubit state readout subsystem, wherein exchange coupling is absent between the superconducting qubit and the resonator.

The electronic system of the above paragraph, wherein the superconducting qubit is coupled to the resonator by a tunable coupler qubit (TCQ), and wherein exchange coupling with the TCQ is only to a mode of the TCQ having an antisymmetric combination of excitations of a pair of Josephson junctions of the TCQ.

The electronic system of any of the above paragraphs, wherein the exchange coupling with the TCQ is facilitated by a pair of parallelly-arranged coupling capacitors having equal capacitance to one another and coupling the mode of the TCQ to one of the resonator or the superconducting qubit.

A method of using a quantum system comprises sending, by a system operatively coupled to a processor, a readout signal to a resonator through a microwave drive port coupled to a tunable coupler qubit (TCQ) that is in turn coupled to a superconducting qubit, and receiving, by the system, a return readout signal at readout electronics coupled to the microwave drive port.

The method of the above paragraph, further comprising driving, by the system, the superconducting qubit and in turn exciting the resonator due to the driving of the superconducting qubit, wherein the driving comprises sending, by the system, a driving signal to the superconducting qubit through a charge line coupled to the superconducting qubit, and wherein the charge line is separate from the resonator.

A method of using a quantum system comprises conducting, by a system operatively coupled to a processor, a dispersive readout of a state of a superconducting qubit, using readout electronics coupled to the superconducting qubit by a resonator, wherein exchange coupling is absent between the superconducting qubit and the resonator.

The method of the above paragraph, further comprising conducting, by the system, exchange coupling to a mode of a tunable coupler qubit (TCQ) that couples the superconducting qubit to the resonator, wherein the mode of the TCQ is a mode having an antisymmetric combination of excitations of a pair of Josephson junctions of the TCQ, and wherein the exchange coupling to the TCQ is facilitated by a pair of parallelly-arranged coupling capacitors having equal capacitance to one another and coupling the mode of the TCQ to one of the resonator or the superconducting qubit.

An advantage of the aforementioned electronic structures, electronic systems and/or methods can be an ability to read a quantum state of a superconducting qubit with minimal and/or omitted unintentional driving of the transmon of the superconducting qubit. In connection therewith, the advantage further can be provided by reduction in leakage errors for measurement of the superconducting qubit.

Indeed, in view of the one or more embodiments described herein, a practical application of the electronic systems, electronic structures and/or methods described herein can be an ability to employ a plurality of neighboring superconducting qubits at a quantum system and to perform measurement readout relative to the plurality of superconducting qubits with minimum or no quantum leakage caused by the measurement readout. This can lead to reduction in overall and/or compound quantum error correction employed for such scalable quantum system. As a result, dispersive readout can be performed for a plurality of superconducting qubits, where each dispersive readout can provide less or no unintended driving of neighboring superconducting qubits.

This is a useful and practical application of computers, thus providing enhanced (e.g., improved and/or optimized) operation of the hardware and/or software components of a target system (e.g., quantum system) by allowing for use increased scaling of size (e.g., number of superconducting qubits) of a quantum system without scaled concern regarding quantum leakage and/or increased quantum error correction. Overall, such tools can constitute a concrete and tangible technical and/or physical improvement in the fields of quantum computing.

Furthermore, one or more embodiments described herein can be employed in a real-world system based on the disclosed teachings. For example, one or more electronic structure embodiments described herein can function with a quantum system that can receive as input a quantum job request and can measure a real-world qubit state of one or more qubits, such as superconducting qubits, of the quantum system. The quantum system can employ one or more electronic structure embodiments described herein, such relative to each superconducting qubit employed in the quantum system.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud operation systems, computer architecture and/or another technology.

One or more embodiments described herein can be fully operational towards performing one or more other functions (e.g., fully powered on, fully executed and/or another function) while also performing the one or more operations described herein.

Further Description

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the quantum circuit measurement readout code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. An electronic system, comprising:
 a superconducting qubit coupled to a tunable coupler qubit (TCQ);
 a microwave drive port coupled to the TCQ; and
 a resonator coupled between the TCQ and the microwave drive port,
 wherein the superconducting qubit is coupled to the TCQ by a pair of parallelly-arranged coupling capacitors having equal capacitance to one another, or wherein the resonator is coupled to the TCQ by the pair of parallelly-arranged coupling capacitors having equal capacitance to one another.

2. The electronic system of claim 1, wherein the resonator is coupled to the microwave drive port by direct capacitive coupling.

3. The electronic system of claim 1, wherein the resonator is coupled to the microwave drive port by inductive coupling.

4. The electronic system of claim 1, absent exchange coupling between the superconducting qubit and the resonator.

5. The electronic system of claim 1, further comprising:
 a charge line separate from the resonator and coupled to the superconducting qubit,
 wherein the charge line is configured to receive signals for driving the superconducting qubit.

6. The electronic system of claim 1, wherein the superconducting qubit is a transmon qubit.

7. The electronic system of claim 1, wherein the superconducting qubit is a capacitively shunted flux qubit.

8. The electronic system of claim 1, wherein the superconducting qubit is a fluxonium-type qubit.

9. The electronic system of claim 1, wherein the superconducting qubit is another TCQ.

10. The electronic system of claim 1, wherein the resonator is one of a waveguide resonator, a coplanar waveguide resonator, or a lumped element resonator.

11. An electronic structure, comprising:
 a superconducting qubit coupled to a tunable coupler qubit (TCQ); and
 a resonator coupled to the TCQ and configured to be coupled to a microwave drive port,
 wherein the TCQ comprises a set of three capacitor pads coupled in series to one another, and wherein the superconducting qubit comprises a first capacitor pad and a second capacitor pad, and
wherein the resonator is coupled to a central capacitor pad of the TCQ, of the set of three capacitor pads.

12. The electronic structure of claim 11, wherein the superconducting qubit is one of a transmon qubit, a capacitively shunted flux qubit, a fluxonium-type qubit, or another TCQ, and wherein the resonator is one of a waveguide resonator, a coplanar waveguide resonator, or a lumped element resonator.

13. The electronic structure of claim 11, wherein the first capacitor pad is coupled to a first outer capacitor pad of the TCQ, of the set of three capacitor pads, and wherein the second capacitor pad is coupled to a second outer capacitor pad of the TCQ, of the set of three capacitor pads.

14. The electronic structure of claim 13, wherein the first capacitor pad is coupled to the first outer capacitor pad of the TCQ by a first direct capacitive coupling, and wherein the second capacitor pad is coupled to the second outer capacitor pad of the TCQ by a second direct capacitive coupling.

15. The electronic structure of claim 14, wherein the first direct capacitive coupling and the second direct capacitive coupling each comprise a coupling capacitor having equal capacitance to one another.

16. An electronic system, comprising:
a superconducting qubit coupled to a resonator that is in turn coupled to a microwave drive port of readout electronics of a qubit state readout subsystem,
wherein the superconducting qubit is coupled to the resonator by a tunable coupler qubit (TCQ), and wherein exchange coupling with the TCQ is only to a mode of the TCQ having an antisymmetric combination of excitations of a pair of Josephson junctions of the TCQ,
wherein the exchange coupling with the TCQ is facilitated by a pair of parallelly-arranged coupling capacitors having equal capacitance to one another and coupling the mode of the TCQ to one of the resonator or the superconducting qubit, and
wherein the exchange coupling is absent between the superconducting qubit and the resonator.

17. The electronic system of claim 16, wherein the superconducting qubit is one of a transmon qubit, a capacitively shunted flux qubit, a fluxonium-type qubit, or another TCQ.

18. The electronic system of claim 16, wherein the resonator is one of a waveguide resonator, a coplanar waveguide resonator, or a lumped element resonator.

19. A method of using a quantum system, comprising:
conducting, by a system operatively coupled to a processor, a dispersive readout of a state of a superconducting qubit, using readout electronics coupled to the superconducting qubit by a resonator, wherein exchange coupling is absent between the superconducting qubit and the resonator; and
conducting, by the system, exchange coupling to a mode of a tunable coupler qubit (TCQ) that couples the superconducting qubit to the resonator, wherein the mode of the TCQ has an antisymmetric combination of excitations of a pair of Josephson junctions of the TCQ, and
wherein the exchange coupling to the TCQ is facilitated by a pair of parallelly-arranged coupling capacitors having equal capacitance to one another and coupling the mode of the TCQ to one of the resonator or the superconducting qubit.

20. The method of claim 19, wherein the superconducting qubit is one of a transmon qubit, a capacitively shunted flux qubit, a fluxonium-type qubit, or another TCQ.

21. An electronic structure, comprising:
a superconducting qubit coupled to a tunable coupler qubit (TCQ); and
a resonator coupled to the TCQ and configured to be coupled to a microwave drive port,
wherein the TCQ comprises a set of three capacitor pads coupled in series to one another,
and wherein the superconducting qubit comprises a first capacitor pad and a second capacitor pad, and
wherein the resonator is coupled to a first outer capacitor pad of the TCQ, of the set of three capacitor pads, and to a second outer capacitor pad of the TCQ, of the set of three capacitor pads.

22. The electronic structure of claim 21, wherein the first capacitor pad or the second capacitor pad is coupled to a central capacitor pad of the TCQ, of the set of three capacitor pads.

23. The electronic structure of claim 22, wherein the first capacitor pad or the second capacitor pad is coupled to the central capacitor pad of the TCQ by direct capacitive coupling, wherein the first outer capacitor pad of the TCQ is coupled to the resonator by a first direct capacitive coupling, and wherein the second outer capacitor pad of the TCQ is coupled to the resonator by a second direct capacitive coupling.

24. The electronic structure of claim 23, wherein the first direct capacitive coupling and the second direct capacitive coupling each comprise a coupling capacitor having equal capacitance to one another.

25. The electronic structure of claim 21, wherein the superconducting qubit is one of a transmon qubit, a capacitively shunted flux qubit, a fluxonium-type qubit, or another TCQ, and wherein the resonator is one of a waveguide resonator, a coplanar waveguide resonator, or a lumped element resonator.

* * * * *